US012566839B2

(12) United States Patent
Zaidi

(10) Patent No.: US 12,566,839 B2
(45) Date of Patent: Mar. 3, 2026

(54) PROVIDING PASSWORD SECURITY IN NON-FEDERATED COMPUTING ARRANGEMENTS

(71) Applicant: DISNEY ENTERPRISES, INC., Burbank, CA (US)

(72) Inventor: Abutalib Zaidi, Orlando, FL (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 345 days.

(21) Appl. No.: 17/957,890

(22) Filed: Sep. 30, 2022

(65) Prior Publication Data

US 2024/0111856 A1  Apr. 4, 2024

(51) Int. Cl.
*G06F 21/46* (2013.01)

(52) U.S. Cl.
CPC .................................... *G06F 21/46* (2013.01)

(58) Field of Classification Search
None
See application file for complete search history.

(56) References Cited

U.S. PATENT DOCUMENTS

| 10,007,779 B1* | 6/2018 | McClintock | ............ G06F 21/31 |
| 2015/0199399 A1* | 7/2015 | Schroetel | ............ G06F 16/2423 |
| | | | 707/767 |
| 2017/0011087 A1* | 1/2017 | Hyde | .................... G06F 16/254 |
| 2021/0149895 A1* | 5/2021 | Tran | .................... G06F 16/2452 |
| 2022/0147613 A1* | 5/2022 | Anderson | ............... G06F 21/46 |

* cited by examiner

*Primary Examiner* — Jeffrey C Pwu
*Assistant Examiner* — Mayasa A. Shaawat
(74) *Attorney, Agent, or Firm* — Squire Patton Boggs LLP; Sarah Mirza

(57) ABSTRACT
One embodiment of a computer-implemented method for automatically generating warnings in a cloud computing arrangement comprises identifying a plurality of queries residing on a non-federated cloud storage service, at least two queries of the plurality of queries directed to disparate data sources; executing a first query of the at least two queries to produce first extracted information and executing a second query of the at least two queries to produce second extracted information, wherein the second extracted information augments the first extracted information; causing the first extracted information and the second extracted information to be stored in an aggregation table; triggering a processing of the aggregation table to identify a password expiration alert; and causing a generating of a notification associated with the password expiration alert for modification of a password corresponding to a service account.

20 Claims, 8 Drawing Sheets

200

230 DATABASES

DISPARATE DATA SOURCES 200

PASSWORD DATABASE 202

CUSTOMER DATABASE 204

AUTHENTICATION FAILURES DATABASE 206

AUTHORIZATION FAILURES DATABASE 208

FINANCIAL DATABASE 210

ANTI PIRACY DATABASE 212

HR DATABASE 214

TABLE SIZE DATABASE 216

DATABASE SIZE DATABASE 218

WAREHOUSE SIZE DATABASE 220

UPTIME DATABASE 222

AGGREGATED ALERT DATA 300

ALERT ID 302

DATABASE ACCOUNT ID 304

PASSWORD EXPIRATION DATE 306

USER REGION 308

USER CREATION DATE 310

USER CONTACT INFORMATION 312

NOTIFICATION DELIVERY METHODS 314

PROVIDING PASSWORD SECURITY IN NON-FEDERATED COMPUTING ARRANGEMENTS

BACKGROUND

Field of the Various Embodiments

Embodiments of the present disclosure relate generally to techniques for providing password security in non-federated computing arrangements.

Description of the Related Art

With the rise of cloud based computing, sensitive corporate information is often stored in databases within cloud storage systems. The stored information includes customer information, financial information, passwords, anti-piracy data, and the like. Access to such a database requires that a user account be created on the database. Some types of user accounts are part of a federated network of interconnected digital business networks with the ability to transparently send data and messages between parties, such that all the networks function as one network and require only a single user authentication. Other user accounts, such as service accounts, are not part of a federated network and are used by software programs to programmatically access the database. Service accounts are also password protected, to limit access to the database and the sensitive information stored therein.

One issue encountered with using a database provided by a cloud platform is maintaining password discipline. As a specific example, corporations often impose policies requiring password rotation on a periodic basis to prevent intrusions and also mitigate intrusions that have gone undetected. However, imposing password rotation requirements on user accounts that are not part of a federated network is often not feasible. In particular, many cloud platforms do not directly support notification of password expiration for service accounts. One technical issue with implementing password rotation for service accounts in non-federated computing arrangements arises from the differences between user accounts and service accounts. Enforcing password rotation for user accounts often relies on notifying the user during login. The user is interacting with a computer during login and can be notified through the graphical user interface that the password is close to expiration. User accounts are different from service accounts in that for a service account a computer program that is logging in and there is no user on the other end to notify. In addition, when a user is locked out due to password expiration only that single user suffers. In contrast, when a service account gets locked out for password expiration, every user who depends on the service provided in conjunction with the service account is deprived of the service. As a result, the same techniques that work for local users do not work in the same way for service accounts. Another technical issue with implementing password rotation for service accounts in non-federated computing arrangements arises from the differences between federated computing arrangements and non-federated computing arrangements. Enforcing network rotation in federated networks relies on the fact that federated networks can transparently send data between parties whereas a non-federated cloud storage system, by definition, does not have the same capabilities. After authenticating on a federated network, the network can provide information to other entities in that network granting seamless access to the authenticated account. A non-federated network does not have that ability.

Likewise, when a password on an entity that is part of the federated network is about to expire, it can push messages back through the network to the user. Again, a non-federated network has no such built-in capability. As a result, the same techniques that work for federated networks do not work for non-federated networks.

As the foregoing illustrates, what is needed are more effective and flexible techniques for monitoring security events such as pending password expiration in non-federated computing arrangements.

SUMMARY

One embodiment of the present disclosure sets forth a computer-implemented method for automatically generating warnings in a cloud computing arrangement. The method includes identifying a plurality of queries residing on a non-federated cloud storage service, at least two queries of the plurality of queries directed to disparate data sources. The method further includes executing a first query of the at least two queries to produce first extracted information and executing a second query of the at least two queries to produce second extracted information, wherein the second extracted information augments the first extracted information. In addition, the method includes causing the first extracted information and the second extracted information to be stored in an aggregation table. The method further includes triggering a processing of the aggregation table to identify a password expiration alert, and causing a generating of a notification associated with the password expiration alert for modification of a password corresponding to a service account.

At least one technical advantage of the disclosed techniques relative to the prior art is that the disclosed techniques provide administrators with a way to promote and enforce password discipline for service accounts in non-federated networks. The proposed techniques work for service accounts as well as user accounts by mitigating the need for notification through user interaction at a graphical user interface. The password rotation notification is sent through alternative asynchronous channels such as email, pager, or incident resolution service provider. The proposed techniques also work for non-federated networks by providing an alternative channel from the database to the user. The proposed mechanism offers ease of implementation and is easily extendable to cover other mission-critical alert needs. In this regard, the disclosed techniques enable administrators to generate notifications to warn of password expiration along with other mission-critical notifications. The technical advantages provide one or more technological advancements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

System Overview

Figure 1:
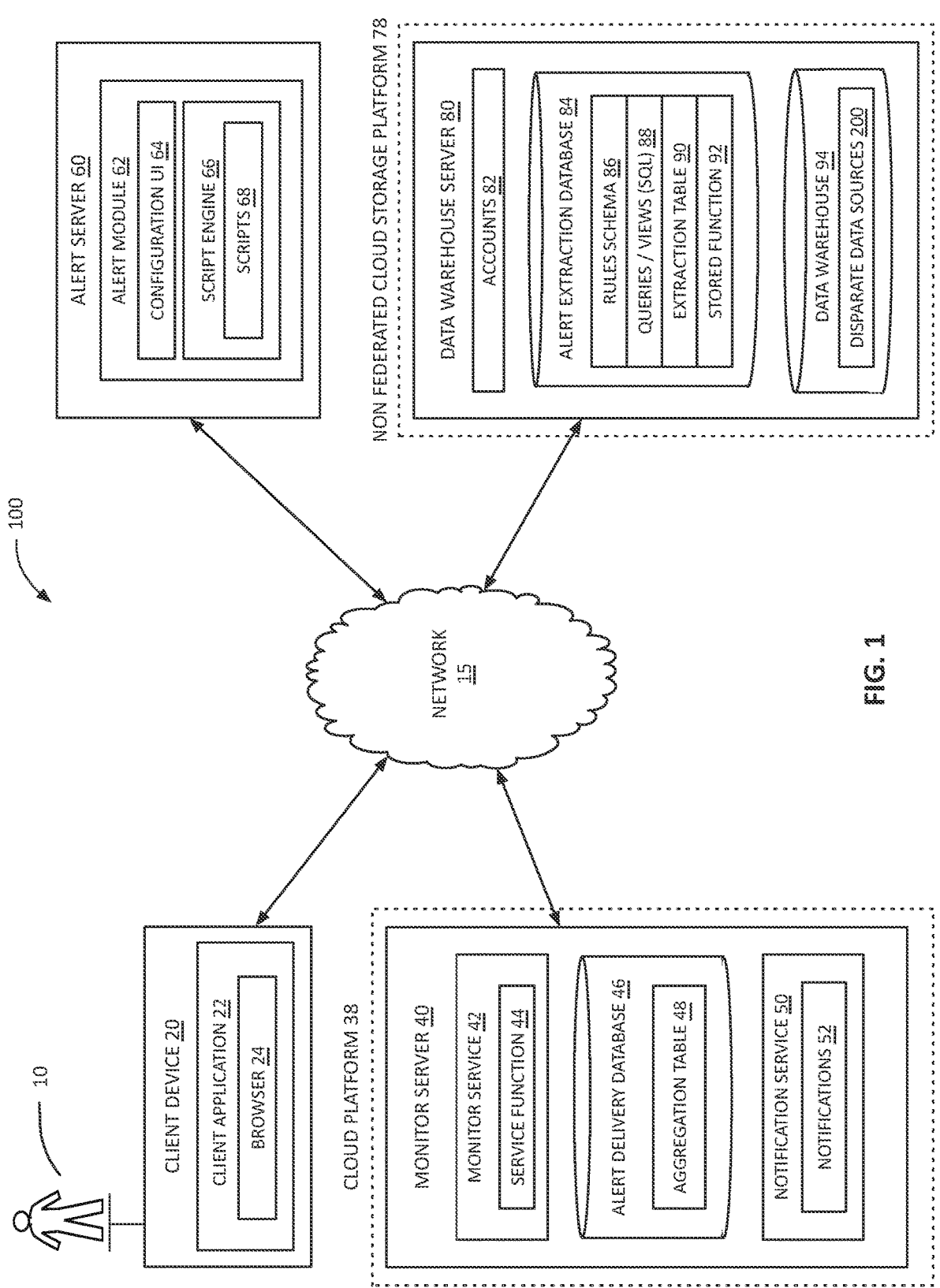
FIG. 1 is a conceptual illustration of a system that is configured to implement one or more aspects of the various embodiments.

FIG. 1, is a conceptual illustration of a system 100 configured to implement one or more aspects of the various embodiments. The system includes a client device 20, monitor server 40, alert server 60, data warehouse server 80, and a network 15 such as, but not limited to, the internet.

The client device 20 includes a client application 22 which includes a browser 24. The client application 22 enables the user 10 to interact with and configure the monitor server 40, alert server 60, and data warehouse server 80. The user 10 of the client device 20 may be a user or an administrator. In some embodiments, the browser is a conventional web browser such as Google Chrome. The client device 20, providing input via the administrator through the client application 22, configures the monitor server 40, alert server 60, and data warehouse server 80 for providing password security in a non-federated computing arrangement. The administrator accomplishes the configuration, in part, by executing an installer at the alert server 60.

The monitor server 40 includes a monitor service 42, alert delivery database 46, and notification service 50. The monitor server 40 operates to deliver alerts to users and administrators via notifications 52. Delivery of alerts is accomplished by receiving the alerts from the data warehouse server 80 and turning the alerts into notifications 52 that are delivered to recipients. In some embodiments, the recipients are users of client devices. The monitor service 42 is triggered when data is stored in the alert delivery database 46. The service function 44 is invoked when the monitor service 42 is triggered. The service function 44 operates to identify alerts in aggregation table 48 by examining the type of alert, formatting according to type, and outputting the alert to notification service 50. The alerts identified in aggregation table 48 are output to the notification service 50 and delivered as notifications 52 by determining the notification delivery method indicated in the alert stored in the aggregation table. Delivery takes the form of an email, text message, pager message, incident resolution service ticket, and the like. In some embodiments, the monitor server 40 is run on Amazon Web Services (AWS), the monitor service 42 is implemented on AWS Lambda, the alert delivery database 46 is implemented on AWS Simple Cloud Storage (s3), and the notification service 50 uses Amazon Simple Notification Service (SNS). In some embodiments, the monitor server 40 may be hosted on a cloud platform 38 such as Amazon Web Services (AWS).

The alert server 60 includes an alert module 62. The alert server 60 operates to configure and coordinate operations between the data warehouse server 80 and the monitor server 40. The alert server 60 executes an installer to accomplish the distribution and configuration of the alert extraction database 84. Configuration of the alert extraction database 84 includes setting up the rules schema 86, queries 88, and stored function 92. The installer also configures the monitor server 40 by connecting the input of monitor service 42 to the output of the alert delivery database 46. Likewise, the output of monitor service 40 is connected to the input of notification service 50. The installer also configures the script engine 66 and one or more scripts 68. Once configured, the script engine executes one or more scripts on a periodic basis, causing the data warehouse server 80 to send alerts to monitor server 40. An alert is identified by the script by locating the alert extraction database 84, executing the queries to identify a condition that requires an alert, and building up the information for the alert in the extraction table 90 by accessing two or more disparate data sources 200. The alert module 62 includes a configuration UI 64 which is used to configure the alert module both at the alert server 60 and remotely from a client device 20. In some embodiments, the scripts are written in the python programming language.

The data warehouse server 80 includes accounts 82, alert extraction database 84, and a data warehouse 94. The data warehouse server operates on a non-federated cloud storage platform to host a data warehouse 94. As used herein, a data warehouse is a collection of disparate data sources that integrates copies of transaction data from the disparate source systems and provisions them for analytical use. As used herein, a database is any collection of data organized for storage, accessibility, and retrieval that provides access to the collection of data through the use of SQL (Structured Query Language). A database is designed to record data whereas a data warehouse is designed to analyze data. The data warehouse server 80 sends outputs in the form of alerts from extraction table 90 to monitor server 40 for storage in aggregation table 48. Accounts 82 store one or more user accounts that have access to the data warehouse server 80. The accounts are user accounts and/or service accounts. Service accounts are used for software programs that need programmatic access to disparate data sources 200. In the case of a service account, the user 10 is termed an administrator. In the case where the account is a simple user account, the user is termed a user. The alert extraction database 84 includes rules schema 86, database queries 88, extraction table 90, and stored function 92. A rules schema 86 describes the structure and organization of the data in the alert extraction database 84. The queries 88 store SQL statements that are executed against the disparate data sources 200 to produce the data aggregated into extraction table 90 one query at a time. The stored function 92 is invoked to output the extraction table 90 to the aggregation table 48. The disparate data sources 200 store various sensitive corporate information for analysis in the data warehouse 94 and are described further in FIG. 2. In some embodiments, the data warehouse server 80 may be hosted on a non-federated cloud storage platform 78 such as Snowflake.

Figure 2:
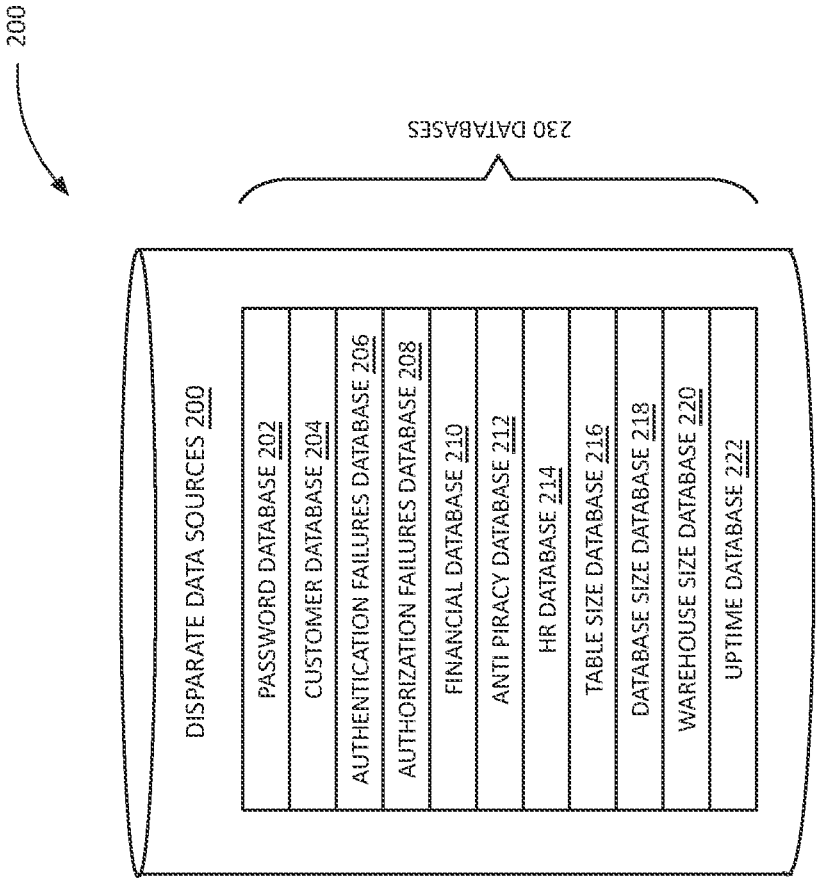
FIG. 2 is a more detailed illustration of the disparate data sources of FIG. 1, according to various embodiments.

Referring now to FIG. 2 a more detailed illustration of the disparate data sources 200 of FIG. 1 is shown. As used herein, disparate data sources are two or more databases that can not be accessed simultaneously for the purpose of executing a single SQL query. Some SQL servers allow for tables in different databases to be joined as long as the different databases are running on the same SQL server and permissions are set to allow access to each of the databases for the account performing the query. Constructing a valid SQL query is accomplished by qualifying the tables to be accessed with database names. In real-world implementations, however, having all databases that need to be accessed running on a single SQL server often proves unfeasible. Issues arise from database size, memory requirements, differing permission needs on different databases, different database versions, different database vendors, incompatible database schemas, and the like. As such, multiple queries run against disparate databases running on different servers to collect all separate data are needed in some cases. The databases 230 shown in the disparate data sources 200 of FIG. 2 are exemplary and different embodiments will have different databases 230. Each of the databases 230 in the disparate data sources 200 has one or more tables. In some embodiments, some databases 230 are used to generate alerts, and some are used to augment the data needed for those alerts. In general, each database 230 in the disparate data sources 200 is used as both a source for alert generation as well as for augmenting alerts generated from any of the databases 230. As used herein, augmenting information refers to filling in one or more missing columns in a first dataset with related information from a second dataset. For example, a database table could have three columns: customer id, customer name, and customer region. A first database query could produce the information needed to fill in the first two columns: customer id and customer name. A second database query against a second disparate database could produce the third column, the customer region. The three columns are aggregated together to produce a complete dataset. The elements of the exemplary disparate data sources 200 are shown as all being separate databases 230. In other embodiments, the present disclosure is not limited thereto. In some implementations, the databases are two or more databases. For example, the password database 202, authentication failures database 206, authorization failures database 208, and financial database 210 could be tables in a security database and the table size database 216, database size database 218, warehouse size database 220, and uptime database 222 could be tables in a mission-critical database.

Disparate data sources 200 include sensitive and mission-critical data such as a password database 202, customer database 204, authentication failures database 206, authorization failures database 208, financial database 210, anti-piracy database 212, HR database 214, table size database 216, database size database 218, warehouse size database 220, and an uptime database 222. The password database 202 stores information related to passwords for user accounts and service accounts. The customer database 204 stores information related to customers. The information in the customer database 204 is used to augment alerts generated from other databases such as the password database 202. The authentication failures database 206 stores information related to failed attempts to authenticate a user. An authentication failure occurs when a username and/or password is not recognized. Alerts are generated when authentication failures exceed a limit which in some instances is indicative of a cyberattack. The authorization failures database 208 stores information related to failed attempts to authorize a user. An authorization failure occurs when a user attempts to perform an action for which they do not have permission. Alerts are generated when authorization failures exceed a limit and in some instances are indicative of a cyberattack. The financial database 210 stores information related to customer payments such as credit card transactions. Alerts are generated when credit card authorizations fail, or accounts go unpaid. Alerts are also generated when unauthorized access is made against stored credit card information. The anti-piracy database 212 stores information related to unlawful or unauthorized distribution of content. The HR (Human Resources) database 214 stores information related to the employees of a company. This information could include sensitive information like social security numbers. The information in HR database 214 is used to augment alerts generated from other databases. The table size database 216 stores information related to the storage taken up by various tables. Alerts are generated when a table size exceeds set limits. The database size database 218 stores information related to the storage taken up by various database. Alerts are generated when a database size exceeds set limits. The warehouse size database 220 store information related to the storage taken up by various warehouses. Alerts are generated when warehouse size exceeds limits. The uptime database 222 stores information related to how long various computer server hardware and/or software have been running. Alerts are generated when too much time has passed since a computer server has been rebooted or since computer software has been restarted.

Figure 3:
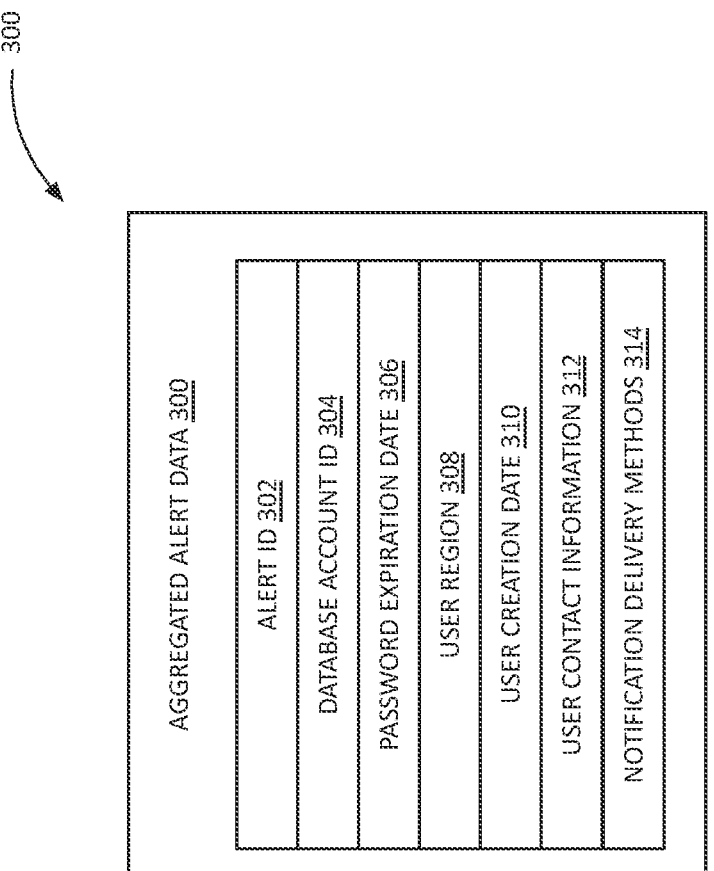
FIG. 3 is a more detailed illustration of the aggregated alert data of FIG. 1, according to various embodiments.

Referring now to FIG. 3, a more detailed illustration of the aggregated alert data 300 of FIG. 1 is shown. The alert id 302 is a unique identifier among alert types where the alert type identifies a different category of alert. Examples of alert types include the password expiration alert, authentication failure alert, authentication failure alert, and the like. The database account id 304 identifies the database 230 for which a password is about to expire. The password expiration date 306 identifies the date on which the password will require. The user region 308 identifies the area of the world and/or the time zone for the user account. The user creation date 310 identifies the date on which the user account was created. The user contact information 312 information identifies user account characteristics that are used in the delivery of notifications. Examples of user contact information 312 include email address, cell phone number, pager number, incident resolution service identifier, and the like. The notification delivery methods 314 information identifies one or more delivery channels for notification delivery. Examples of notification delivery methods 314 include email, text message, pager message, incident resolution service, and the like. FIG. 3 refers to an extraction table 90 for password expiration alerts in its completed form prior to transmission to the aggregation table 48. Extraction tables 90 for other types of alerts, such as authentication failure alerts, authorization failure alerts, table size alerts, database size alerts, data warehouse size alerts, and uptime alerts will have different formats and columns.

Figure 4A:
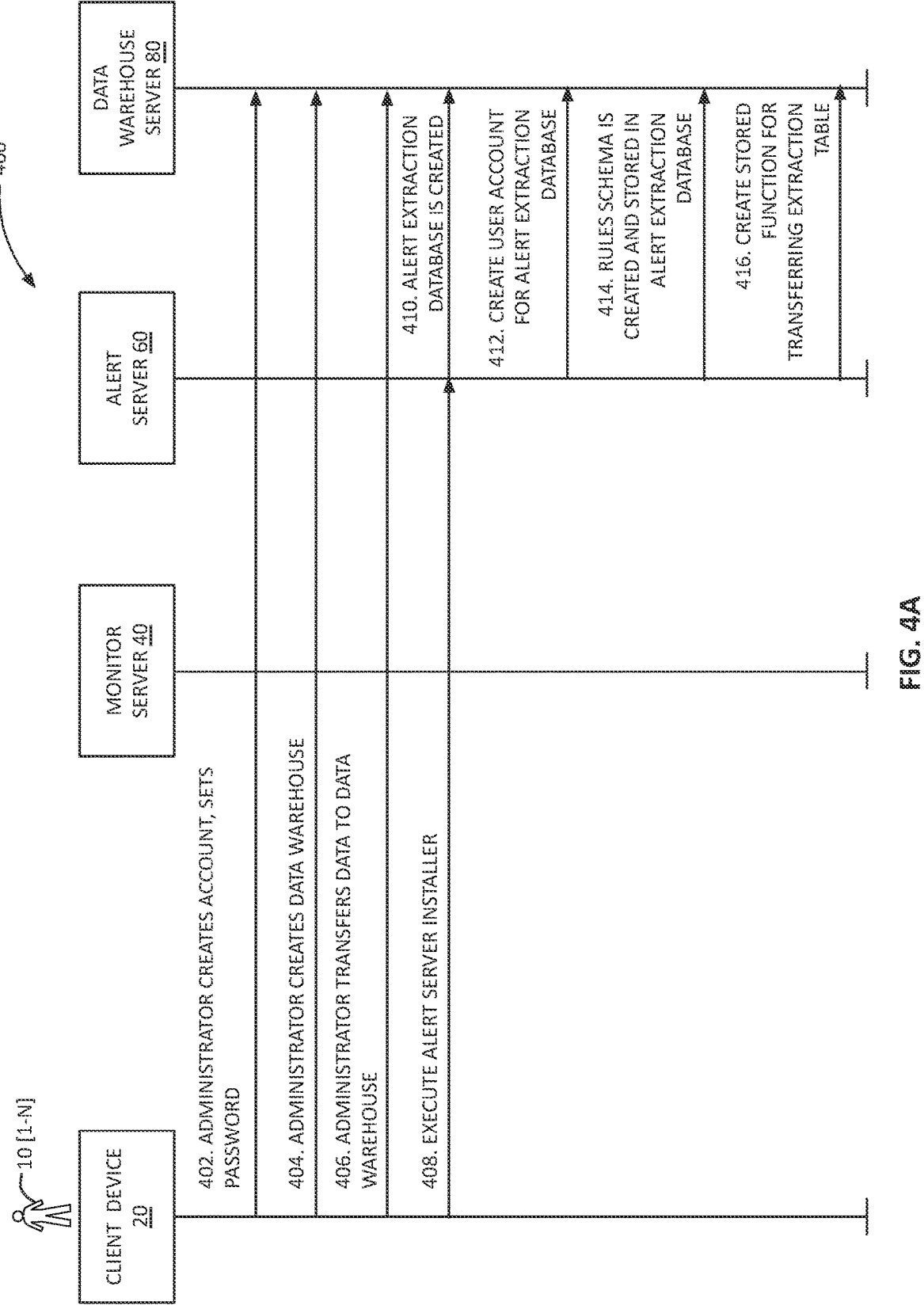
FIG. 4A is a more detailed illustration of the operations implemented by the system of FIG. 1, according to various embodiments.

Referring now to FIG. 4A, a more detailed illustration of the operations implemented by the system of FIG. 1 is shown 400. The user 10 operates the client device 20 to create 402 a service account 82 at the data warehouse server 80 and sets a password. The user 10 creates 404 a data warehouse 94 by creating one or more disparate data sources 200 at the data warehouse server 80 and transfers 406 data to the data warehouse 94. The user 10 executes 408 an installer for the alert module 62 that in turn creates 410 the alert extraction database 84 at the data warehouse server 80. The installer creates 412 a dedicated user account in accounts 82 for the alert extraction database 84. The installer creates 414 the rules schema 86 which is stored in the alert extraction database 84. In creating and configuring the data warehouse 94 and executing the installer for the alert module 62 the user 10 operates as an administrator.

The installer creates 416 a stored function 92 for transferring the extraction table 90, when complete, to the aggregation table 48. In some embodiments, the stored function 92 transfers one or more tables using one or more formats including CSV, XML, and JSON. A comma-separated values (CSV) file is a delimited text file that uses a comma to separate values. Each line of the file is a data record. Each record consists of one or more fields, separated by commas. Extensible Markup Language (XML) is a markup language and file format for storing, transmitting, and reconstructing arbitrary data. XML defines a set of rules for encoding documents in a format that is both human-readable and machine-readable. JavaScript Object Notation (JSON) is an open standard file format and data interchange format that uses human-readable text to store and transmit data objects consisting of attribute-value pairs and arrays (or other serializable values). Other embodiments will use other transmission formats and remain in the scope of the present disclosure.

Figure 4B:
FIG. 4B is a more detailed illustration of the operations implemented by the system of FIG. 1, according to various embodiments.

Referring now to FIG. 4B, a more detailed illustration of the operations implemented by the system of FIG. 1 is shown 400. FIG. 4B starts where FIG. 4A ends. The alert server 60 creates 417 a monitor service 42 at the monitor server 40 with a service function 44 triggered by a storage event at the alert delivery database 46. The alert server 60 creates 418 a notification service 50 topic with a destination specified to email at the monitor server 40. The alert server 60 adds 420 the notification service topic to the service function 44 as the destination. In some embodiments, the monitor server 40 is run on Amazon Web Services (AWS), the monitor service 42 is implemented on AWS Lambda, the alert delivery database 46 is implemented on AWS Simple Cloud Storage (s3), and the notification service 50 uses Amazon Simple Notification Service (SNS). The alert server 60 script engine 66 executes 422 the script 68 that runs queries 88 to build up the extraction table 90 until the information needed for an alert is complete 424 and is sent 428 to the monitor server 40 for storage in the aggregation table 48. The script 68 invokes one or more queries 88 and runs in a loop 426 until done. The steps 422-428 are repeated 430 for each of one or more alerts identified by the one or more scripts 68. In some embodiments, step 428 is performed as a cron job. The cron command-line utility is a job scheduler on Unix-like operating systems. Users who set up and maintain software environments use cron to schedule jobs, also known as cron jobs, to run periodically at fixed times, dates, or intervals.

Figure 4C:
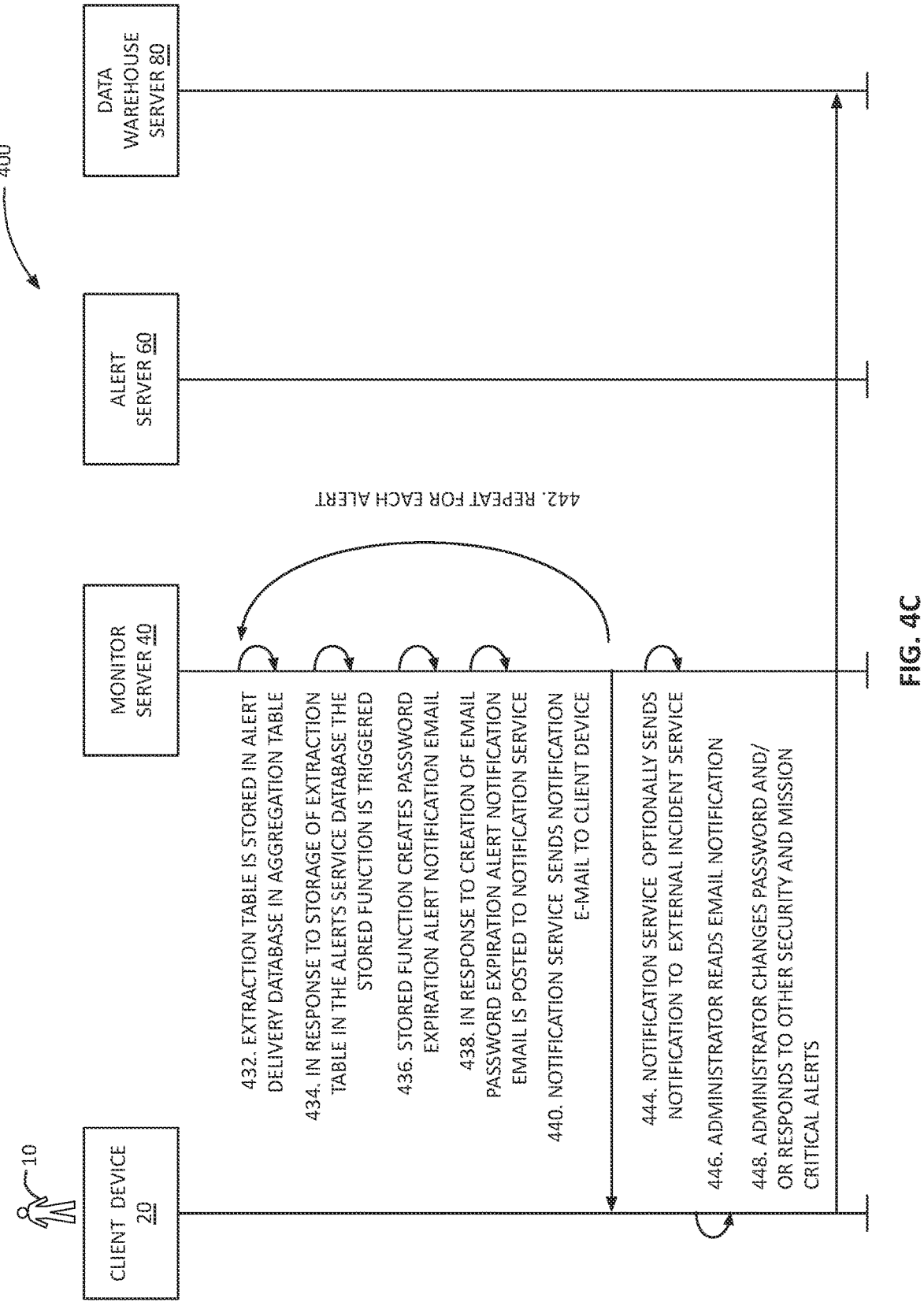
FIG. 4C is a more detailed illustration of the operations implemented by the system of FIG. 1, according to various embodiments.

Referring now to FIG. 4C, a more detailed illustration of the operations implemented by the system of FIG. 1 is shown 400. FIG. 4C starts where FIG. 4B ends. The monitor server 40 stores 432 the extraction table 90 in the aggregation table 48. The storage function 92 is triggered 434 by the storage of the extraction table 90 in the aggregation table 48. The storage function 92 creates 436 a notification 52 in response to invocation. In some embodiments, the notification 52 takes the form of an email. The notification 52 is posted 438 to the notification service 50. The notification service 50 sends 440 out the notification 52. In the case of an email notification, an email is delivered to the client device 20. The steps 432-440 are repeated 442 for each extraction table 90 received from the data warehouse server 80 and stored in the aggregation table 48. The notification service 50 optionally sends 444 notifications 52 using other delivery mechanisms including text message, pager message, incident resolution service, and the like. In some embodiments, the incident resolution service is implemented using the ServiceNow IT Ticketing System. The email notification is received 446 by the client device 20 and read by the administrator 10. In some instances, the account is a service account and the user 10 is an administrator. In other instances, the account is a user account and the user 10 is a user. The administrator 10 responds to the email by accessing the data warehouse server 80 and changing 448 the password.

Process Overview

Figure 5:
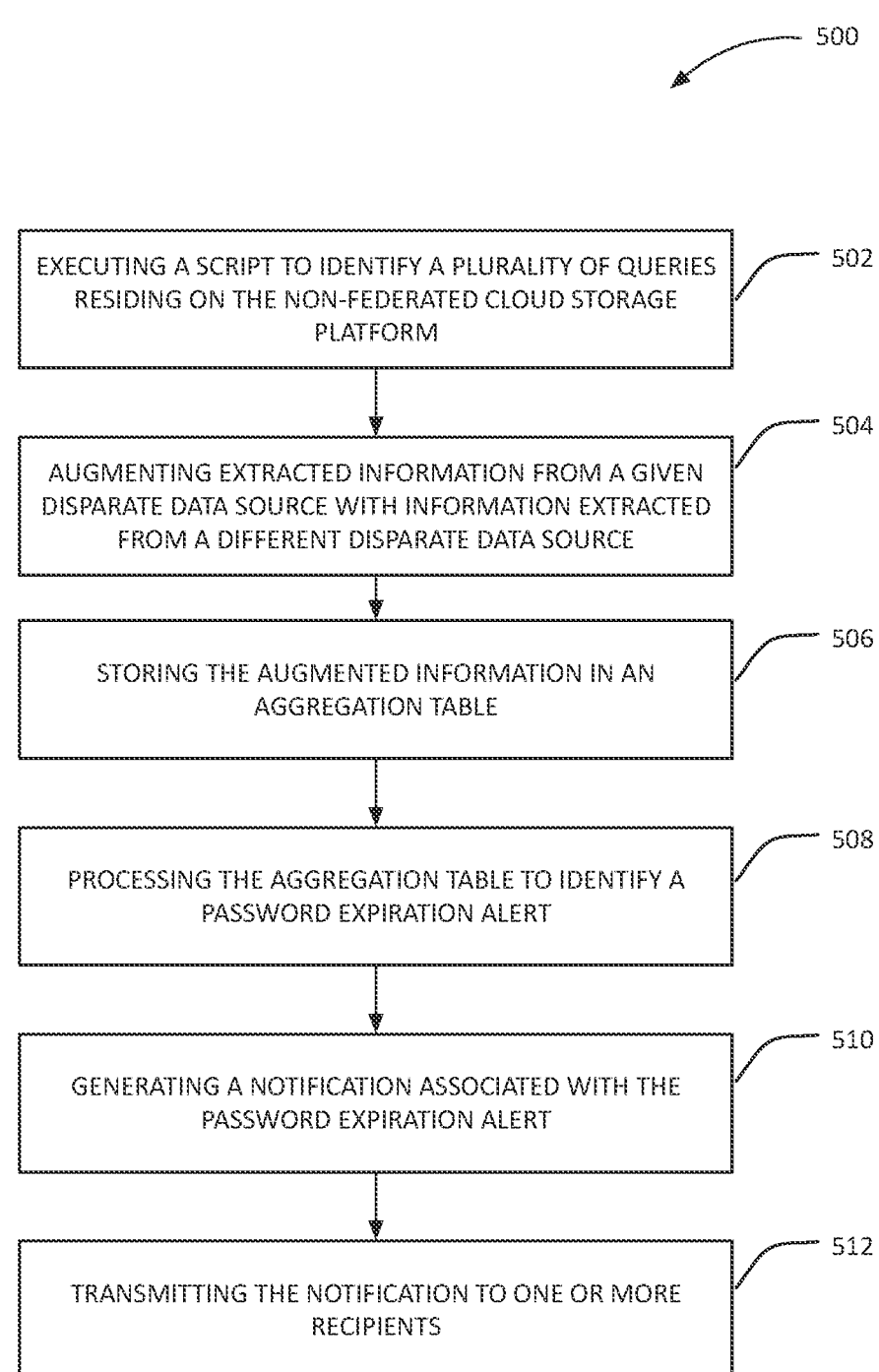
FIG. 5 is a flow diagram of method steps for automatically generating warnings in a cloud computing arrangement, according to various embodiments.

FIG. 5 is a flow diagram of method steps for automatically generating warnings in a cloud computing arrangement, according to various embodiments. Although the method steps are described in conjunction with the systems of FIGS. 1-4, persons of ordinary skill in the art will understand that any system configured to perform the method steps, in any order, is within the scope of the present disclosure.

As shown in FIG. 5, method 500 begins at step 502, where an alert module executes a script to identify a plurality of queries residing on the non-federated cloud storage platform 502. Script 68 locates queries 88 in the alert extraction database 84. The queries 88 are directed to two or more disparate sources 200 stored in the data warehouse 94. Script 68 is executed periodically by the script engine 66. In some embodiments, the script 68 is executed manually.

At step 504, the alert module augments extracted information from a given disparate data source with information extracted from a different disparate data source 504. The script 68 executes a first query 88 against a first disparate data source 200 to produce first extracted information which is stored in the extraction table 90. However, the information is incomplete and additional information is needed. The script 68 executes a second query 88 against a second disparate data source 200 to produce second extracted information which is used to complete the previously incomplete information stored in the extraction table 90. There is no limit on the number of queries required to complete the information in the extraction table 90.

At step 506, the alert module causes the storing of the augmented information in an aggregation table 506. The completed information that is built up in extraction table 90 in step 504 is sent from the alert extraction database 84 to aggregation table 48 of the alert delivery database 46. The form of the data stored in the aggregation table 48 will differ based on alert id 302. For example, in the case where the alert id identifies a password expiration alert, the information in aggregation table 48 will take the form of aggregated alert data 300. In some embodiments, the stored function 92 transfers one or more tables using one or more formats including CSV, XML, and JSON.

At step 508, the method continues with processing the aggregation table to identify a password expiration alert 508. The processing of the aggregation table 48 is triggered by the storing of the contents of the extraction table 90 from the alert extraction database 84 into the aggregation table 48 of the alert delivery database 46. The processing involves identifying an alert in the aggregation table 48 and outputting it to the notification service 50.

At step 510, the method continues with causing a generating of a notification associated with the password expiration alert 510. The generating of the notification is invoked by the processing of the aggregation table 48 of step 508. The type of notification that is generated is based on the notification delivery methods 314. For example, the notification delivery methods 314 could be one or more of email message, text message, pager message, incident resolution service ticket, and the like. There is no limit on the number of notification delivery methods 314 used. For example, in some instances, a notification will be sent out on multiple or all notification delivery methods 314.

At step 512, the method continues with transmitting the notification to one or more recipients 512. The notification 52 that is generated in step 510 by the notification service 50 is delivered according to notification delivery methods 314. The delivery is accomplished using user contact information 312. The user contact information 312 information identifies user account characteristics that are used in the delivery of notifications. Examples of user contact information 312 include email address, cell phone number, pager number, incident resolution service identifier, and the like.

Figures 6, 7:
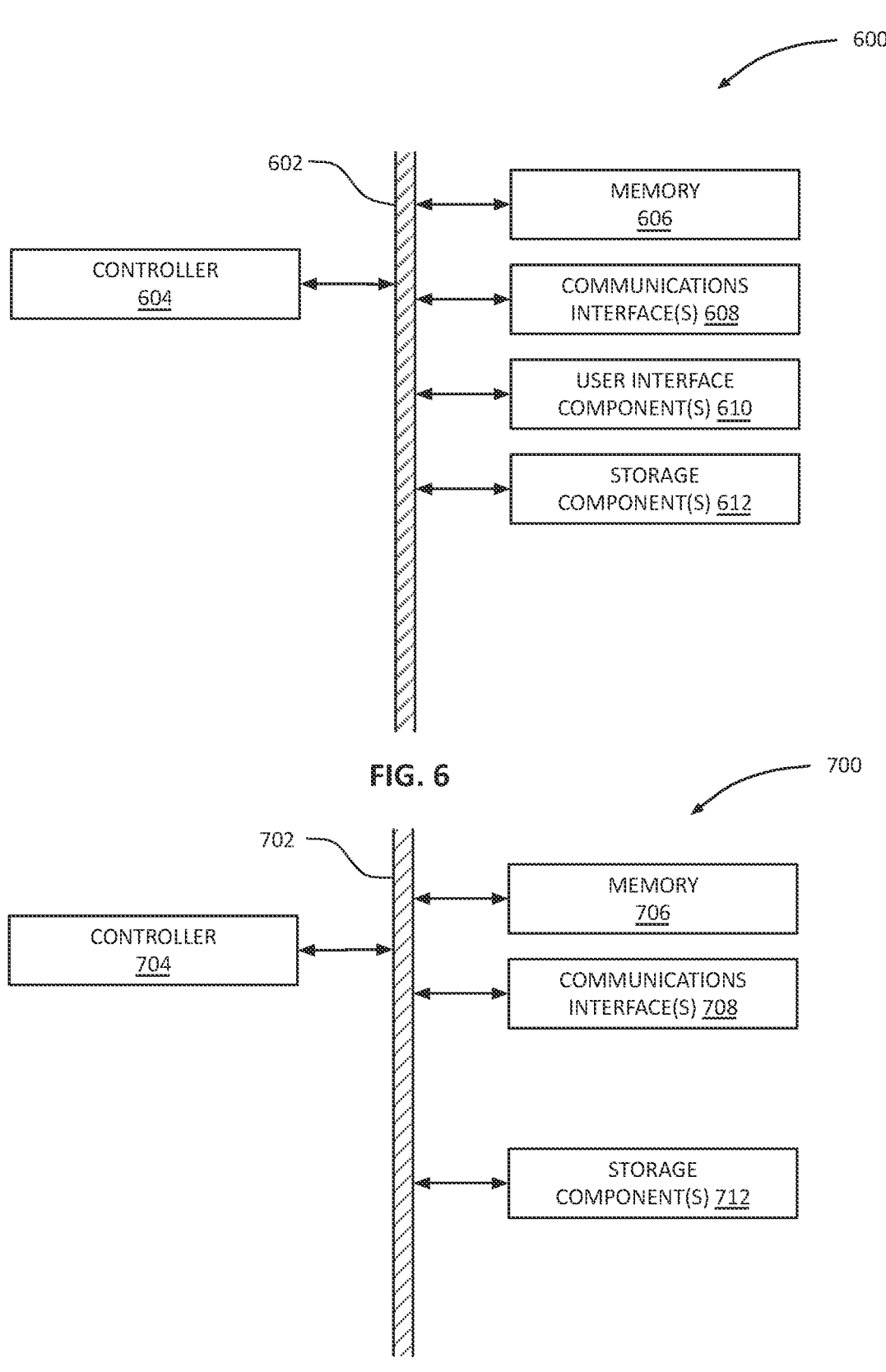
FIG. 6 is a conceptual illustration an exemplary client device hardware architecture configured to implement one or more aspects of the various embodiments.
FIG. 7 is a conceptual illustration an exemplary server device hardware architecture configured to implement one or more aspects of the various embodiments.

Referring now to FIG. 6, exemplary client device 20 hardware architecture 600 configured to implement one or more aspects of the various embodiments is shown. The client device 20 includes a controller 604 communicatively connected to memory 606, one or more communications interfaces 608, one or more user interface components 610, and one or more secondary storage devices 612 by a bus 602 or similar mechanism. The controller 604 is, for example, a microprocessor, digital ASIC, FPGA, or the like. In the present disclosure, the controller 604 is a microprocessor, and the client application 22 is implemented in software and stored in the memory 606 for execution by the controller 604. However, the present disclosure is not limited thereto. The client device 20 includes one or more secondary storage components 612. The secondary storage components 612 is digital data storage components such as, for example, one or more hard disk drives. However, the present invention is not limited thereto. The client device 20 also includes a communication interface 608 enabling the client device 20 to connect to the network 15. For example, the communications interface 608 is a local wireless interface such as a wireless interface operating according to one of the suite of IEEE 802.11 standards, BLUETOOTH®, or the like. However, the present disclosure is not limited thereto. The one or more user interface components 610 include, for example, a touchscreen, a display, one or more user input components (e.g., a keypad), a speaker, or the like, or any combination thereof. The storage component(s) 612 is a non-volatile memory.

Referring to FIG. 7, exemplary server device hardware architecture configured to implement one or more aspects of the various embodiments is shown 700. The monitor server 40 and data warehouse server 80 (hereinafter "servers") adhere to the exemplary server device hardware architecture. The servers include a controller 704 communicatively connected to memory 706, one or more communications interfaces 708, and one or more secondary storage devices 712 by a bus 702 or similar mechanism. The controller 704 is, for example a microprocessor, digital ASIC, FPGA, or the like. In this embodiment, the controller 704 is a microprocessor, and the software application is implemented in software and stored in the memory 706 for execution by the controller 704. However, the present disclosure is not limited thereto. The aforementioned module may be implemented in software, hardware, or a combination thereof. The servers also include a communication interface 708 enabling the servers to connect to the network 15. For example, the communications interface 708 is a wired interface such as an Ethernet interface. However, the present disclosure is not limited thereto. The servers include one or more secondary storage components 712. The secondary storage components 712 is digital data storage components such as, for example, one or more hard disk drives. However, the present invention is not limited thereto. In some embodiments, the servers are rack mount servers and/or a blade servers. Server devices are often optimized for speed, throughput, power consumption, and reliability. In some embodiments, the servers are operated as part of cloud computing arrangements such as AWS, Snowflake, Google Cloud Platform, Microsoft Azure, IBM Cloud, and the like.

The alert server 60 may be executed on a client device 20 using client hardware architecture 600 or on a server device using server hardware architecture 700. When a server device is used, the server device may be hosted on a cloud platform.

In sum, techniques are disclosed that enable the automatic generation of warnings in a cloud computing arrangement. The techniques identify alerts by analyzing conditions in disparate data sources by running queries stored in a database. The disparate data sources store information related to security and mission-critical operations of an entity such as a company. The security information includes password information, authentication failures, authorization failures, and the like. The mission-critical information includes table size, database size, warehouse size, uptime time, and the like. Disparate data sources are two or more databases that cannot be accessed simultaneously for the purpose of executing a single SQL query. First and second queries are executed against first and second disparate data sources to produce first and second extracted information. The second extracted information augments the first extracted information. Augmenting information refers to filling in one or more missing columns in a first data set with related information from a second dataset. The first and second extracted information are stored together in an extraction table and transferred to an aggregation table at a monitor server. The storing of the aggregation table at the monitor server triggers the processing of the aggregation table to identify one or more alerts. Based on the processing of the aggregation table one or more notifications are generated for the corresponding one or more alerts.

At least one technical advantage of the disclosed techniques relative to the prior art is that the disclosed techniques provide administrators with a way to promote and enforce password discipline for service accounts in non-federated networks. The proposed techniques work for service accounts as well as user accounts by mitigating the need for notification through user interaction at a graphical user interface. The password rotation notification is sent through alternative asynchronous channels such as email, text message, pager message, incident resolution service ticket, or the like. The proposed techniques also work for non-federated networks by providing an alternative channel from the database to the user. The proposed mechanism offers ease of implementation and is easily extendable to cover other mission-critical alert needs. In this regard, the disclosed techniques enable administrators to generate notifications to warn of password expiration along with other mission-critical notifications. The technical advantages provide one or more technological advancements over prior art approaches.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for automatically generating warnings in a cloud computing arrangement, the method comprising:

identifying a plurality of queries residing on a non-federated cloud storage platform, at least two queries of the plurality of queries directed to disparate data sources, wherein the disparate data sources include two or more databases that are inaccessible simultaneously for the purpose of executing a single query;

executing a first query of the at least two queries to produce first extracted information and executing a second query of the at least two queries to produce second extracted information, wherein the second extracted information produced based on executing the second query completes information in an extraction table missing from the first extracted information according to a schema defining structure and organization of data in a database in which the extraction table is contained;

causing the first extracted information and the second extracted information to be stored in an aggregation table;

triggering a processing of the aggregation table to identify a password expiration alert based on an alert identifier associated with entries in the aggregation table; and causing a generating of a notification associated with the password expiration alert for modification of a password corresponding to a service account.

2. The computer-implemented method of claim 1, wherein the plurality of queries residing on the non-federated cloud storage platform is stored in a database at a data warehouse server.

3. The computer-implemented method of claim 1, wherein the disparate data sources are at least two separate databases running on two separate instances of a database server at the non-federated cloud storage platform.

4. The computer-implemented method of claim 1, wherein the second extracted information augments the first extracted information by the second extracted information by filling in one or more missing columns in the first extracted information.

5. The computer-implemented method of claim 1, wherein causing the first extracted information and the second extracted information to be stored in the aggregation table further comprises storing the first extracted information and the second extracted information in the extraction table.

6. The computer-implemented method of claim 5, wherein causing the first extracted information and the second extracted information to be stored in the aggregation table further comprises transferring the extraction table to the aggregation table.

7. The computer-implemented method of claim 6, wherein the extraction table is transferred to the aggregation table using one of a CSV format, XML format, and a JSON format.

8. The computer-implemented method of claim 6, wherein the extraction table resides in an alert extraction database hosted on the non-federated cloud storage platform and the aggregation table resides in an alert delivery database hosted on a separate cloud platform.

9. The computer-implemented method of claim 1, wherein storing the first extracted information and the second extracted information in the aggregation table triggers the processing of the aggregation table.

10. The computer-implemented method of claim 9, wherein processing the aggregation table further comprises identifying a plurality of alerts, wherein the password expiration alert is one of the plurality of alerts.

11. One or more non-transitory computer-readable media storing instructions that, when executed by one or more processors, cause the one or more processors to perform the steps of:

identifying a plurality of queries residing on a non-federated cloud storage platform, at least two queries of the plurality of queries directed to disparate data sources, wherein the disparate data sources include two or more databases that are inaccessible simultaneously for the purpose of executing a single query;

executing a first query of the at least two queries to produce first extracted information and executing a second query of the at least two queries to produce second extracted information, wherein the second extracted information produced based on executing the second query completes information in an extraction table missing from the first extracted information according to a schema defining structure and organization of data in a database in which the extraction table is contained;

causing the first extracted information and the second extracted information to be stored in an aggregation table;

triggering a processing of the aggregation table to identify a password expiration alert based on an alert identifier associated with entries in the aggregation table; and causing a generating of a notification associated with the password expiration alert for modification of a password corresponding to a service account.

12. The one or more non-transitory computer-readable media of claim 11, wherein causing the first extracted information and the second extracted information to be stored in the aggregation table further comprises transferring the extraction table to the aggregation table.

13. The one or more non-transitory computer-readable media of claim 12, wherein the extraction table is transferred to the aggregation table using one of a CSV format, XML format, and a JSON format.

14. The one or more non-transitory computer-readable media of claim 12, wherein the extraction table resides in an alert extraction database hosted on the non-federated cloud storage platform and the aggregation table resides in an alert delivery database hosted on a separate cloud platform.

15. The one or more non-transitory computer-readable media of claim 11, wherein storing the first extracted information and the second extracted information in the aggregation table triggers the processing of the aggregation table.

16. The one or more non-transitory computer-readable media of claim 15, wherein processing the aggregation table further comprises identifying a plurality of alerts, wherein the password expiration alert is one of the plurality of alerts.

17. The one or more non-transitory computer-readable media of claim 16, wherein at least one of the plurality of alerts is a security alert, the security alert identifying one of the password expiration alert, an authentication alert, and an authorization alert.

18. The one or more non-transitory computer-readable media of claim 16, wherein at least one of the plurality of alerts is a mission-critical alert, the mission-critical alert identifying one of a financial alert, table size alert, database size alert, warehouse size alert, and uptime alert.

19. The one or more non-transitory computer-readable media of claim 11, further comprising causing a delivery of the notification associated with the password expiration alert by one or more of email, text message, pager alert message, and incident resolution service ticket.

20. A system comprising:

a memory storing a design application; and a processor coupled to the memory that executes an alert module to perform the steps of:

identifying a plurality of queries residing on a non-federated cloud storage platform, at least two queries of the plurality of queries directed to disparate data sources, wherein the disparate data sources include two or more databases that are inaccessible simultaneously for the purpose of executing a single query;

executing a first query of the at least two queries to produce first extracted information and executing a second query of the at least two queries to produce second extracted information, wherein the second extracted information produced based on executing the second query completes information in an extraction table missing from the first extracted information according to a schema defining structure and organization of data in a database in which the extraction table is contained;

causing the first extracted information and the second extracted information to be stored in an aggregation table;

triggering a processing of the aggregation table to identify a password expiration alert based on an alert identifier associated with entries in the aggregation table; and causing a generating of a notification associated with the password expiration alert for modification of a password corresponding to a service account.

* * * * *